United States Patent [19]
Breed et al.

[11] 4,279,175
[45] Jul. 21, 1981

[54] ADJUSTMENT FOR SHIFT FORK ON A SHIFT RAIL OF A TRANSMISSION

[75] Inventors: Michal A. Breed, Muskego; George T. Prince, West Allis, both of Wis.

[73] Assignee: Allis-Chalmers Corporation, Milwaukee, Wis.

[21] Appl. No.: 90,607

[22] Filed: Nov. 2, 1979

[51] Int. Cl.³ .......................... G05G 9/14; F16D 1/00
[52] U.S. Cl. .................................. 74/473 R; 29/464; 403/4; 411/544
[58] Field of Search ............. 74/473 R; 192/82 R; 403/3, 4, 356, 358, 362; 85/50 R, 50 B; 29/464

[56] References Cited

U.S. PATENT DOCUMENTS

| 1,686,704 | 10/1928 | Marles | 85/50 B |
| 2,125,396 | 8/1938 | Olshevsky | 85/50 R |
| 2,972,386 | 2/1961 | Tanke | 29/464 |
| 4,048,870 | 9/1977 | Hulsebusch | 74/473 R |

*Primary Examiner*—Allan D. Herrmann
*Attorney, Agent, or Firm*—Arthur L. Nelson

[57] ABSTRACT

A selectively adjustable means for positioning a shift fork on a shift rail. The adjustable means correlates the shift fork with a shift lever position and assures full engagement of the clutch teeth when the lever is shifted. Positive detent mechanism will assure the transmission will not jump out of gear while coasting or driving under load.

10 Claims, 8 Drawing Figures

ADJUSTMENT FOR SHIFT FORK ON A SHIFT RAIL OF A TRANSMISSION

This invention relates to a transmission, and more particularly to an adjustable device on a shift rail and shift fork of a vehicle transmission, wherein the relative position of the shift fork on the shift rail can be selectively positioned to assure full engagement of the gears when the shift lever is shifted. A positive detent mechanism with shifter fork in the engaged position will assure the transmission will not jump out of gear while coasting or during drive under heavy loads.

Vehicle transmissions having shift forks on shift rails selectively engage a clutch sleeve with the gears of a speed ratio for driving the vehicle. When the shift lever is moved from the neutral to the shift position to engage a gear ratio, the shift fork must move the clutch sleeve to fully engage the gears; and when the shift lever is moved from the shift position to the neutral position to disengage a gear ratio, the shift fork must move the clutch sleeve to fully disengage the gears as the vehicle transmission is shifted into neutral. Adjustment of the shift forks, conventionally, have been accomplished by bending a shifting fork. This is unsatisfactory, since it requires that the shift fork be made of light weight material so that the fork can be bent. If the shift fork is not sturdy it may bend when under excessive strain or wear and may later cause defective operation of the transmission.

Accordingly, this invention provides a shifter fork which can be of more substantial and durable construction and can be hardened to improve its wear qualities, since it does not require bending of shifting fork for adjustment. An adjustable device positions the shift fork relative to the shift rail and once the adjustment is made, the transmission can be fully shifted into engagement, or fully disengaged in the neutral position. A positive detent is provided which will effectively hold the transmission in gear or out of gear and prevent the transmission from disengaging when the vehicle is coasting or when the transmission is in the drive or engaged position and under heavy load.

Accordingly, it is an object of this invention to provide a shift fork adjuster on a shift rail for selectively adjusting the relative position of the shift fork on the rail.

It is another object of this invention to provide an adjustable device for selectively positioning a shift fork on a shift rail and to prevent rotation of the fork on the shift rail.

It is a further object of this invention to provide a device for adjustably positioning the shift fork on the shift rail through a fastening means having selective plate for presetting the plate position on the rail axially and for preventing rotation of the shift fork on the shift rail.

The objects of this invention are accomplished by providing an adjustable positioning device for axially positioning the shift fork on the shift rail and prevent rotation relative to the rail. A fastening means is fastened through selective plates of the same length having a bolt hole positioned selectively different lengths from the end of the plate. This in turn axially positions the shift fork on the rail and firmly positions the fork on the shift rail.

Referring to the drawings the preferred embodiment of this invention is illustrated.

Figure 1:
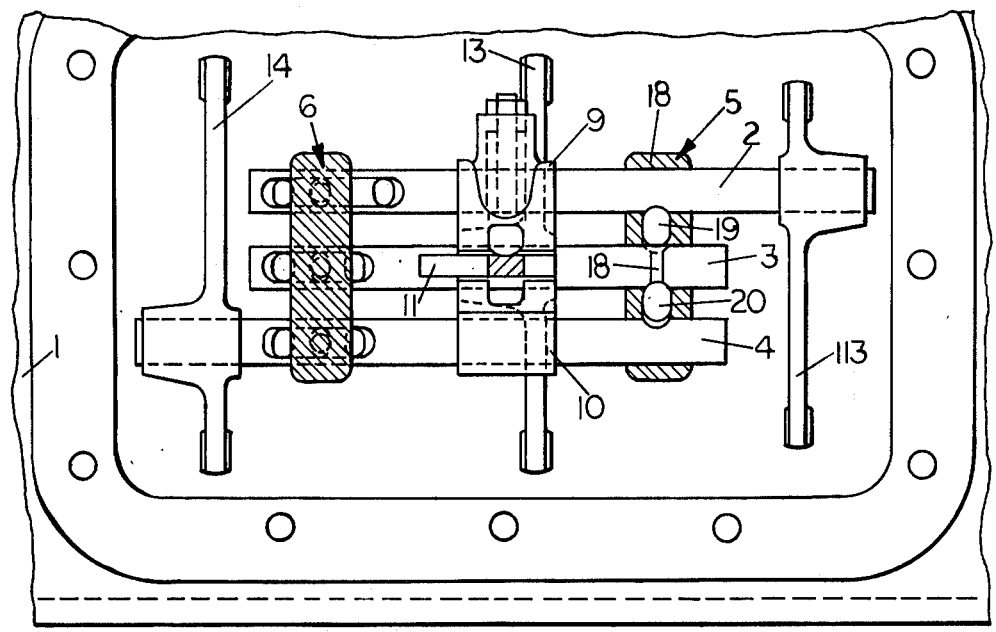
FIG. 1 is a partial section view showing the top of the shift rails and shift forks in the transmission.
Figure 2:
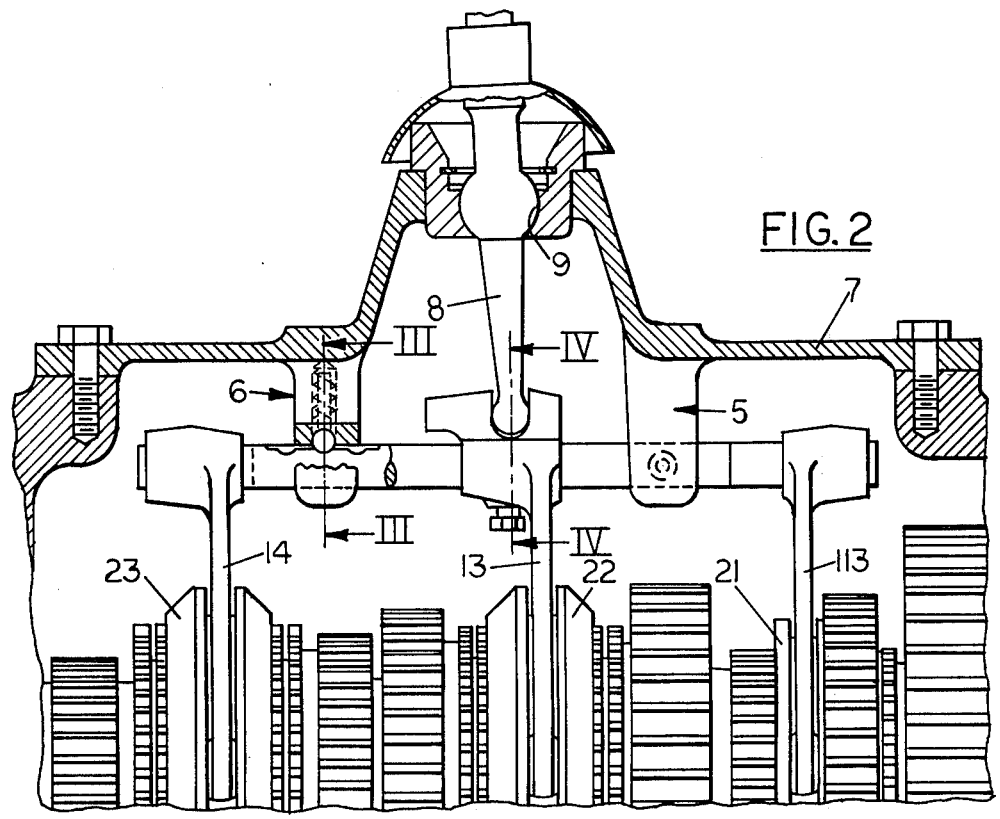
FIG. 2 is a cross-section view showing the side of the shift rails and clutch collars for shifting the transmission.
Figure 3:
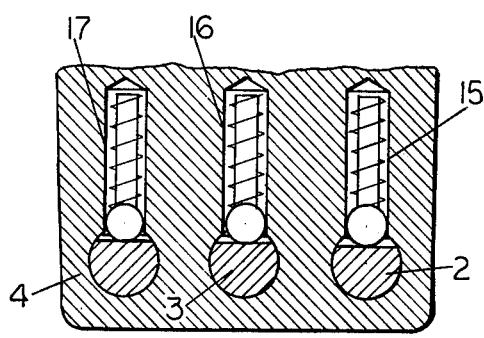
FIG. 3 is a cross-section view taken on line III'III of FIG. 2 showing the detent mechanisms.
Figure 4:
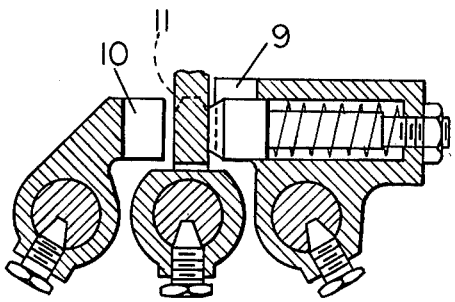
FIG. 4 is a cross-section view taken on line IV—IV of FIG. 2 showing a portion of the shift lever for selective engagement with the lugs for selectively reciprocating each of the shift rails.
Figure 5:
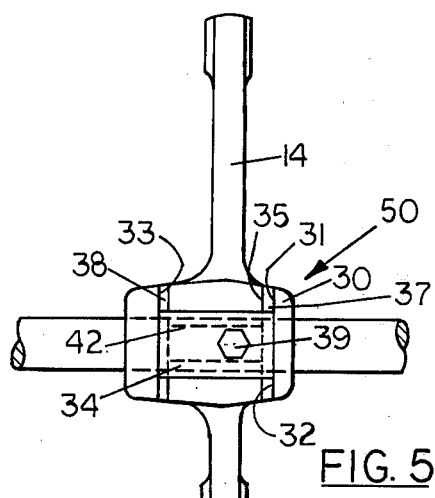
FIG. 5 is a plan view of a portion of a shift rail and shift fork.

Referring to the drawings, FIGS. 1 and 2 show the components of a vehicle transmission and their relative positions therein. A transmission housing 1 encloses the transmission. The shift rails 2, 3 and 4 are reciprocally mounted in the depending portions 5 and 6 of the cover plate 7.

The shift lever 8 is mounted in a socket 9 of the cover plate 7 for selectively positioning the lower end of the shift lever 8 in one of the lugs 9, 10 or 11 for selectively shifting one of the shift rails. The shift rail 2 carries shift fork 113 and shift rail 3 carries shift fork 13, while the shift rail 4 carries the shift fork 14.

The detent mechanism 15 operates in conjunction with a shift rail 2. The detent mechanism 16 operates in combination with the shift rail 3 while the detent mechanism 17 operates in combination with a shift rail 4. Each detent mechanism operates to engage a detent slot in the respective shift rail, as the shift rail is shifted fore and aft or to a neutral position. The detent slots are shown in FIG. 1. An interlock mechanism, including pins 18, 19 and 20, is shown. The pins selectively engage grooves in the shift rails to allow one shift rail to move while the other two are retained in a locked position.

The shift fork 113 operates a clutch sleeve 21, shift fork 13 operates the clutch sleeve 22 and the shift fork 14 operates a clutch sleeve 23. The shifting mechanism is operated manually by the shift lever 8.

Referring to FIGS. 5, 6, 7 and 8, the adjusting device for the shift fork and rail is shown. The device as shown is included in combination with each shift fork and shift rail. For the purpose of illustration, the shift fork 14 will be described in conjunction with the shift rail 4. A sleeve portion 30 of the shift fork 14 is formed with a transverse slot 31. The side walls 32 and 33 of the transverse slot 31 are spaced apart slightly farther than the length of the plate 34. A second transverse slot 35 is formed on a sleeve portion 30, the base surface 36 of the secondary transverse slot 35 is shown slightly lower than the top of the shift rail 4 and the slot is not as long as the primary slot 31. Accordingly, the shoulder 37, 38 are formed. The plate 34 rests on the shoulders and clears the upper side of the shift rail 4. The plate 34 is pressed downwardly and deformed slightly by the fastening bolt 39 which extends through an opening 40 in the plate 34. The bolt 39 threadedly engages a threaded opening 41 in the shift rail to fasten the plate firmly on the shoulders 37, 38. Since the secondary transverse slot 35 is recessed below the upper surface of the shift rail 4, an elongated opening 42 is formed, allowing the bolt 39 to be positioned in a plurality of positions along the length of the secondary slot 35 through opening 42 as the relative position of the rail to the fork changes.

Figure 8:
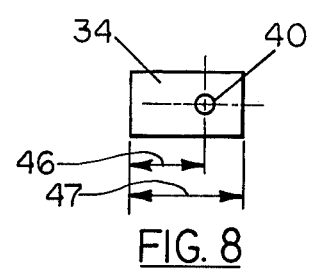
FIG. 8 shows the plate for mounting on the sleeve portion of the shift fork.
Figure 6:
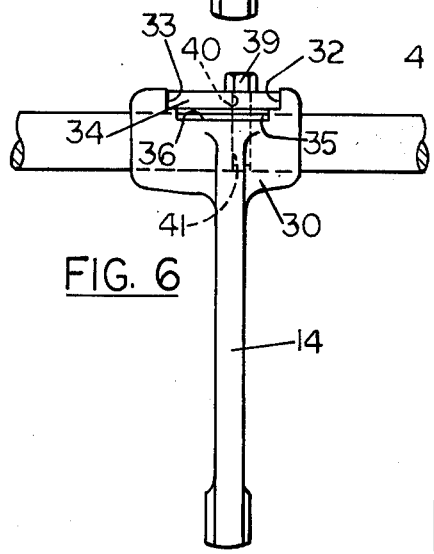
FIG. 6 is a side view of a portion of a shift rail and the adjusting device on the shift fork.
Figure 7:
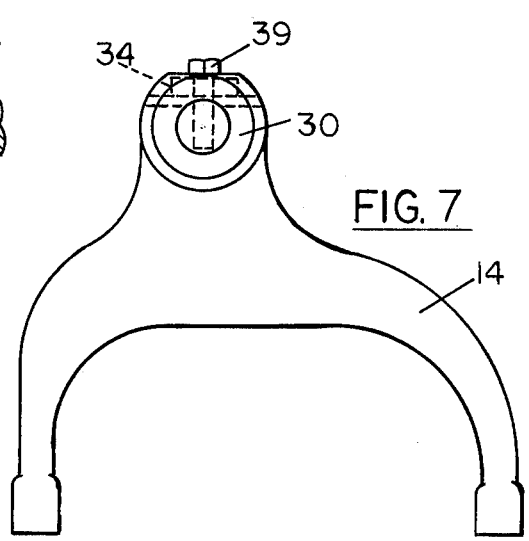
FIG. 7 is a end view of a shift rail and the adjusting device on the shift fork.

The plate 34 is shown in FIG. 8 with the opening 40 for receiving the bolt. The dimension 46 is selectively varied to provide the adjustment of the shift fork 14 on a shift rail 4, depending on the dimension 46. The total overall dimension 47 is a constant dimension and slightly less than the dimension of the primary slot 31. By selecting the plates of varying dimensions 46, the shift fork 14 is selectively positioned axially along the axial length of the shift rail 4, depending on the variation in the length of the dimension 46. For the purposes of illustration, the dimension 46 is greater than one-half the dimension 47. It is understood the dimension 46 may be one-half the dimension 47 or any other dimension.

The operation of the device will be described in the following paragraphs.

Each of the shift rails operate within the transmission and each can be shifted to a predetermined dimension fore and aft. This dimension is a fixed dimension and controlled by limits defined by the detents 15, 16 and 17 of the transmission. Each of the clutch sleeves, however, are shifted from a neutral position to an engaged position fore and aft as determined by the clutch teeth, which the clutch sleeve engages. Each of the clutch sleeves must fully engage the clutch teeth on the driving or driven gear in order to provide complete engagement of the clutch teeth, since there may be manufacturing variations in the construction of the transmission and also the transmission may incur wear causing the clutch sleeve to not fully engage or disengage as the transmission is shifted, adjustability is required. Accordingly, the shift fork and shift rail adjusting device 50 is provided on the shifting fork at the point where it is fastened to the shift rail, by means of a plurality of plates 34 each with a selected varying dimension 46. The bolt 39 fastens in the threaded opening 41 in the shift rail 4. The bolt extends through the opening 40, fastens the plate 34 to the shift rail and likewise fastening the shift fork 14. Since the length 47 of the plate 34 is essentially the same as the slot dimension between the side walls 32 and 33 of the transverse slot 31, the shift rail is fixed in its axial position. The ends of the plate bear on the shoulders 37 and 38 keep the shift fork 14 from rotating on the rail 14. If for some reason, the axial position of the shift rail is to be changed, a selected plate of different dimension 46 than previously used to fasten the shift fork on the rail will then be used. The length of the dimension 46 from the end of the plate to the hole 40 varies, and the position of a shift fork 14 on the shift rail 4 is correspondingly varied. This provides a manner in which the shift fork can be firmly locked on the shift rail and will not rotate or shift axially. Once a shift fork is fastened, it will retain its position and assure positive operation of the shift mechanism to fully engage and disengage the clutch teeth when a shift lever is operated.

The embodiments of the invention in which an exclusive property or privilege is claimed are defined as follows:

1. An adjustable device on a shift rail and shift fork of the vehicle transmission comprising, a vehicle transmission including at least one reciprocally mounted shift rail, a shift lever mounted for reciprocating said shift rail, a shift fork mounted on said shift rail adapted for shifting a clutch in at least one gear ratio in the transmission, an adjustable device adjustably positioning said shift fork on a said shift rail including a sleeve portion of said shift fork embracing said shift rail, a transverse primary slot formed in said sleeve portion of said shift rail, an axially elongated opening in said slot extending through one side of said sleeve portion, a selected one of a plurality of plates having a length approximately equal to the width of said transverse slot and having a hole a selected predetermined dimension from one end of said plate, a bolt extending through said hole of said plate in said opening in said sleeve portion of said shift fork thereby fastening the shift fork on the shift rail in a predetermined axial position.

2. An adjustable device on a shift rail and shift fork of a vehicle transmission as set forth in claim 1 including means defining a secondary slot slightly deeper and slightly narrow than said primary slot thereby defining a space between said plate and the base of said secondary slot at the bolt hole, said bolt thereby deforming and producing tension in the plate when tightened.

3. An adjustable device on the shift rail and shift fork of a vehicle transmission as set forth in claim 1, including means defining a secondary slot slightly deeper and slightly narrower than said primary slot and extending through the wall of one side of said sleeve portion of said shift fork to form said elongated opening in said sleeve portion of said shift fork.

4. An adjustable device on a shift rail and shift fork of a vehicle transmission as set forth in claim 1, wherein said plate defines a hole positioned at equal lengths from each end of said plate.

5. The adjustable device on shift rail and shift fork of a vehicle transmission as set forth in claim 1 including means on said plate defining unequal dimensions from opposing ends of said plate to said hole.

6. An adjustable device on a shift rail and shift fork of a vehicle transmission as set forth in claim 1 including means defining a secondary slot forming shoulders between the ends of said secondary slot and said primary slot for resting said plate to prevent the rotation of said shift fork on said shift rail.

7. An adjustable device on a shift rail and shift fork of a vehicle transmission as set forth in claim 1, wherein said plate defines a rectangular configuration, means defining said elongated opening with a width essentially the same as the diameter of said hole in said plate.

8. An adjustable device on shift rail and shift fork of a vehicle transmission as set forth in claim 1 including means defining the length of said elongated opening the same dimension as the width of said secondary slot.

9. An adjustable device on a shift rail and shift fork of a vehicle transmission as set forth in claim 1, wherein said shift fork includes hardening means to improve the wear quality of said fork.

10. An adjustable device a shift rail and shift fork of a vehicle transmission as set forth in claim 1, including surfaces on said sleeve portion of said shift fork defining a bottom surface of the primary transverse slot positioned above the shift rail and the surface of the secondary slot positioned below the shift rail to allow said bolt to deform and produce tension in said plate when fastening said shifting fork to said shift rail.

* * * * *